United States Patent
Sagol et al.

(10) Patent No.: US 7,328,861 B2
(45) Date of Patent: Feb. 12, 2008

(54) PARTICULATE MATERIAL SPREADER

(75) Inventors: Sami Sagol, Ramat Hasharon (IL); Zvi Zak, Herzlia (IL)

(73) Assignee: Keter Plastic Ltd, Herzelyia (IL)

( * ) Notice: Subject to any disclaimer, the term of this patent is extended or adjusted under 35 U.S.C. 154(b) by 246 days.

(21) Appl. No.: 11/075,726

(22) Filed: Mar. 10, 2005

(65) Prior Publication Data

US 2006/0016918 A1    Jan. 26, 2006

(30) Foreign Application Priority Data

Jul. 20, 2004 (IL) ...................................... 163103

(51) Int. Cl.
*A01C 17/00* (2006.01)

(52) U.S. Cl. .................. 239/687; 239/67; 239/650; 239/681; 222/333

(58) Field of Classification Search ............. 239/67, 239/69, 152, 650, 653, 654, 668, 681, 686, 239/687; 222/333; 406/102
See application file for complete search history.

(56) References Cited

U.S. PATENT DOCUMENTS

| | | | |
|---|---|---|---|
| 3,993,225 A | 11/1976 | Manni | |
| 4,071,170 A * | 1/1978 | Gunzel et al. | 406/102 |
| 4,089,441 A * | 5/1978 | Cole et al. | 239/654 |
| 4,140,280 A * | 2/1979 | Allen et al. | 239/654 |
| 4,678,377 A * | 7/1987 | Bouchard | 222/630 |
| 5,119,993 A | 6/1992 | Gunzel, Jr. et al. | |
| 5,409,166 A | 4/1995 | Gunzel, Jr. et al. | |
| 5,429,278 A * | 7/1995 | Sansalone | 222/333 |
| 6,092,746 A * | 7/2000 | Dillon | 239/653 |
| 6,425,500 B2 | 7/2002 | McNally | |
| 6,840,468 B2 * | 1/2005 | Barnett | 239/653 |

* cited by examiner

*Primary Examiner*—Steven J. Ganey
(74) *Attorney, Agent, or Firm*—The Nath Law Group; Jerald L. Meyer; Jonathan A. Kidney

(57) ABSTRACT

An electrically powered hand-held material spreader for spreading particulate material comprising: a hopper; a dispensing mechanism disposed below the hopper; an aperture disposed at a bottom of the hopper and above the dispensing mechanism; an electric power assembly comprising an electric motor, a power source and a power switch; and a handle positionable above the hopper.

13 Claims, 2 Drawing Sheets

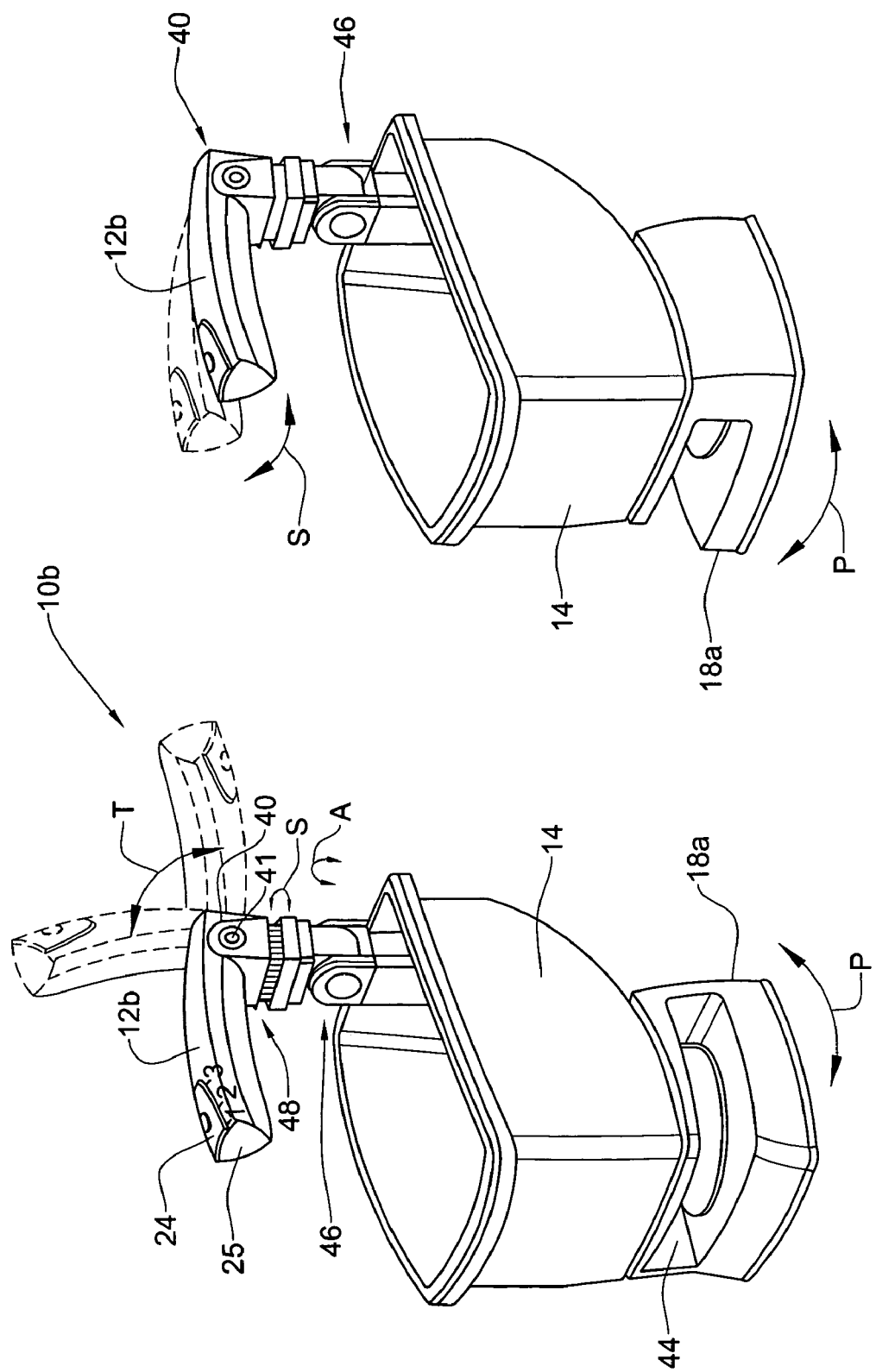

PARTICULATE MATERIAL SPREADER

FIELD OF THE INVENTION

This invention relates to devices for distributing particulate material on the ground, particularly electrically powered hand-held devices.

BACKGROUND OF THE INVENTION

Devices for distributing or spreading particulate material historically comprise a hopper for holding the material and a mechanically driven distributing mechanism. In cases where a compact and easily portable device is preferable, a hand-held material spreader is commonly used, in which case the distributing mechanism is typically driven by a hand crank and the device includes a grip or handle for carrying and orienting it.

More sophisticated hand-held devices comprise an auxiliary power source thereby reducing fatigue of a user, freeing one of the user's hands and typically improving the uniformity of the material distribution.

Devices such as these are described in U.S. Pat. No. 3,993,225 (Manni), U.S. Pat. No. 5,409,166 and U.S. Pat. No. 5,119,993 (Gunzel Jr. et al) and U.S. Pat. No. 6,425,500 (McNally).

U.S. Pat. No. 3,993,225 discloses an operator carryable unitary assembly for distributing a particulate material from a front end thereof. The assembly has a housing for enclosing a drive, the housing including a handle, a cylindrical distribution chamber with a vertical axis and a slot directed away from the handle. A motor is mounted below the distribution chamber to rotate a rotor within the chamber, the rotor having vanes spaced from the center of the rotor. A hopper is removably mounted to the top of the distribution chamber. A control means is provided on the handle adjacent the side toward the distribution chamber for controlling the motor, and for controlling the flow of particulate material from the hopper into the distribution chamber.

U.S. Pat. No. 5,409,166 discloses a portable electric-powered particulate spreader with a housing having an inlet and an outlet. A reservoir for holding particulate material is located above the housing and a handle for holding the spreader is located behind the housing. A blower is located with a flow path extending from the inlet to the outlet for inducing air flow along the flow path. A particulate intake port is formed in a channel wall which encompasses an exhaust channel extending downstream from the blower to the outlet. A valve controls flow of particulate material from the reservoir to the particulate intake port. An agitator located between the reservoir and exhaust channel rotationally reciprocates and induces vibrations which assist the flow of particulate material. A foil in the exhaust channel produces a low static pressure which tends to draw particulate material from the reservoir into the air flow. Delays are built in so that the blower turns on before opening the valve is opened and the valve is closed before the blower is turned off. U.S. Pat. No. 5,119,993 discloses a similar material spreader.

U.S. Pat. No. 6,425,500 discloses a portable device for dispensing a particulate salt material upon a ground surface having a body with a substantially hollow interior, a forwardly located and open dispensing end and a reclosable end cap engaged with a rearwardly located end for permitting the hollow interior to be filled holding a volume of the particulate material. A rotor element is mounted in communication with the first open end and includes a plurality of individual and arcuately arrayed dispensing portions arranged around a central cross wise extending and rotatable shaft. A driving mechanism is associated with the body for actuating the rotor element to dispense volumes of the held particulate and may include either a hand-operated crank or an electric motor operatively connected to the rotatable shaft and powered by at least one battery contained within the hollow interior of the body and electrically communicable with the motor.

SUMMARY OF THE INVENTION

The present invention relates to an electrically powered hand-held material spreader for spreading particulate material. The spreader comprises a hopper; a dispensing mechanism disposed below the hopper; an aperture disposed at the bottom of the hopper and above the dispensing mechanism; an electric power assembly comprising an electric motor, a power source and a power switch; and a handle disposed above the hopper.

The term "particulate material" herein the specification and claims denotes a bulk of particles in their broadest meaning including powders, granular material, seeds, pellets and the like, which can include, for example, fertilizer, pesticides, chemicals, insecticides, weed killers, herbicides, ice salt, calcium chloride, etc.

By one embodiment of the material spreader of the present invention, the spreader comprises an aperture selector for adjusting the opening size of the aperture.

By another embodiment of the present invention, the speed of the motor may be adjusted, for example, controllable by settings associated with the power switch and being easily accessible by at least one finger of an operator's hand holding the device.

By yet another embodiment of the present invention, the handle comprises a tilting and/or angling and/or swivel mechanism whereby the handle is tiltable and/or can be angled and/or can be swiveled with respect to the hopper. In its operative position, the handle is typically positioned directly and centrally above the hopper whereby the center of gravity of the spreader (particularly when it is loaded with material) is below the handle—meaning below the typical location of the hand of a user that is gripping the handle. However, the above-mentioned handle positioning mechanisms also allow for the handle to be put in a convenient position for storage and shipping whereby nesting is facilitated. For this purpose, the hopper and base typically have correspondingly shaped.

By still another embodiment of the present invention the spreader comprises a base, in particular a base having a pivoting mechanism for pivoting the base relative to the hopper. Via pivoting of the base, the direction in which the material is dispensed can be changed and controlled.

Advantages of the material spreader of the present invention include at least the following:

- An electrically controlled spreader provides for a more uniform dispersion of material compared to a hand-driven spreader wherein user would be required to sustain a constant crank-turning rate.
- Since such a spreader does not require a user to crank an output handle, there is less user fatigue and it is easier to use.
- Only one hand is required, thus freeing up one of the user's hands for other uses.
- As only one hand is required, the spreader can be comfortably held away from body.

It is safer/cleaner—because it can be held away from the body there is less chance of material landing on the user or inhaling the material.

Dispersing the material in corners and/or along fences and the like is more convenient due to one-handed operation.

Appropriately designed for right-handed and left-handed people as there is no crank handle on one (or the other) side of the spreader.

Light weight—a small electric motor is lighter than transmission gearing.

The material output rate is controllable "on the fly" via controlling the opening of the outlet aperture (i.e. there is no need to stop to adjust a manual opening).

The material coverage rate is controllable "on the fly" by adjusting the speed of the motor via settings at the power switch.

The output direction can be controlled via adjustment/pivoting of the base.

The handle is above the hopper of the spreader whereby (a) the spreader can be conveniently held so that dispensing material is not dispensed close to the face and upper body of an operator, thereby reducing operator exposure to the material; (b) it is easier to control the location of spread material; (c) a more comfortable arm position may be used—a generally relaxed hanging position instead of a fatiguing upheld position wherein the user's elbow is considerably bent; and (d) the output of material is closer to the ground resulting in a more accurately located dispersion and less opportunity for a breeze to carry the material beyond the desired distribution area.

The handle is above the center of gravity of the spreader and so the user need not apply any force to balance or level it.

The handle position is adjustable and can thus be put in a comfortable (ergonomic) position for a user and can be moved away from hopper for more convenient loading of material. Such adjustability is particularly convenient when both left-handed and right-handed people use the same spreader.

BRIEF DESCRIPTION OF THE DRAWINGS

In order to understand the invention and to see how it may be carried out in practice, embodiments will now be described, by way of non-limiting examples only, with reference to the accompanying drawings, in which:

FIGS. 3A and 3B are isometric views of further embodiments of the present invention illustrating control of the material dispensing direction as well as showing a mechanism for allowing flexible positioning of the spreader's handle.

DETAILED DESCRIPTION OF EMBODIMENTS

Figures 1, 2:
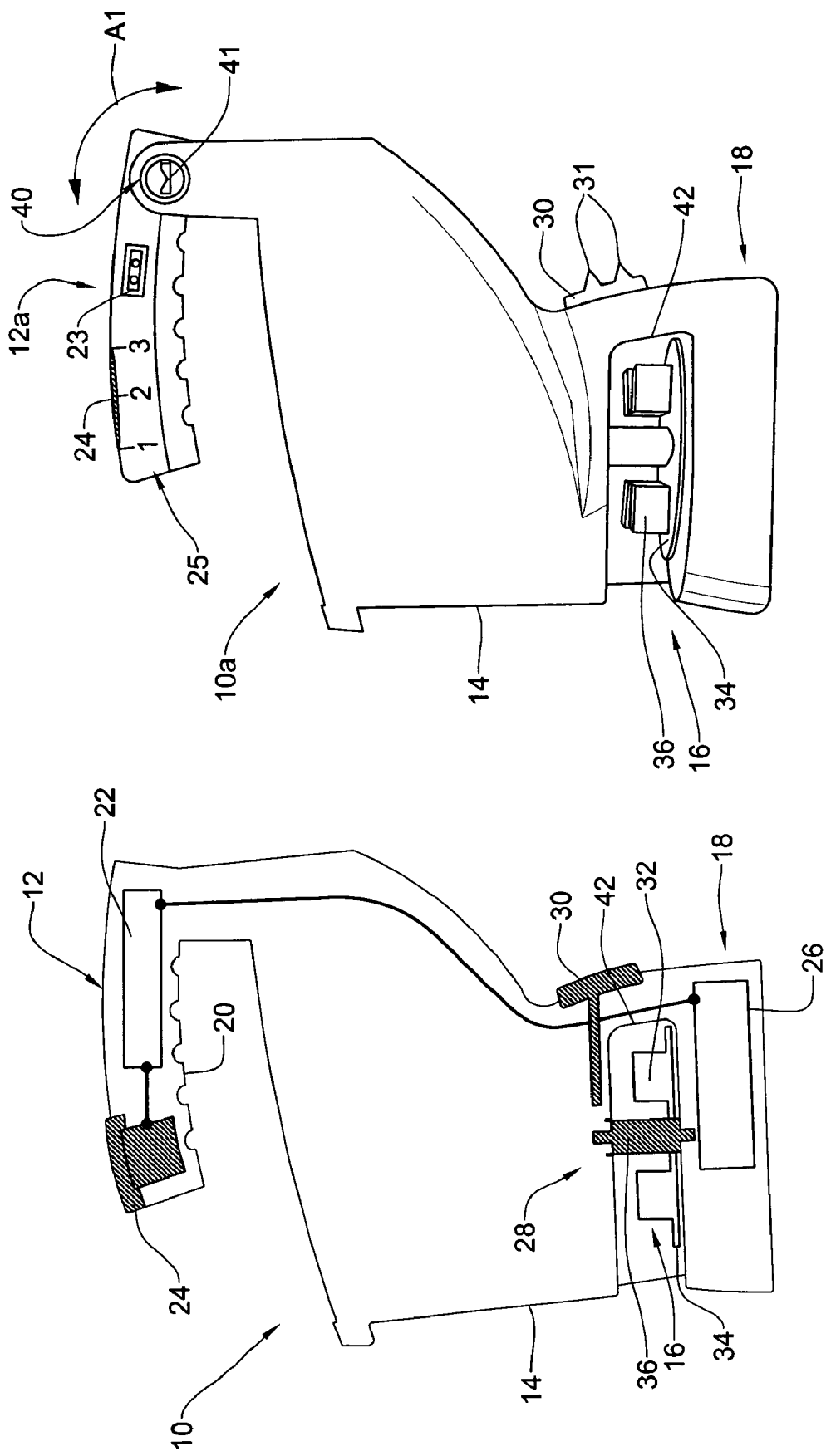
FIG. 1 is a section of one embodiment of a hand-held electrically powered particulate-material spreader according to an embodiment of the present invention.
FIG. 2 is a slightly elevated side view showing another embodiment of the present invention illustrating a mechanism for allowing the spreader's handle to tilt.

Referring first to FIG. 1 of the drawings there is shown a hand-held electrically-powered particulate-material spreader according to an embodiment of the present invention, generally designated as 10. The spreader 10 comprises a handle 12, a reservoir or hopper 14, a dispensing arrangement 16 and a base 18.

The handle 12, which is disposed above the hopper 14, includes a grip 20 and houses a power source 22, typically a replaceable or rechargeable battery (for which a charging socket 23 can be located adjacent the power source). A power switch 24 in the handle 12 closes an electrical circuit thereby actuating an electric motor 26 housed in the base 18. The handle 12 is typically designed to be above the center of gravity of the spreader 10 (preferably, regardless of whether the spreader is loaded with material or not) so that it may be carried with ease at a balanced and comfortable position.

The hopper 14 is designed to conveniently hold particulate material (not shown) and allow gravity feed to the dispensing arrangement 16 via an aperture 28 located at the bottom of the hopper. The spreader 10 may include a selector 30 for adjusting the opening size of the aperture 28, and thus for adjusting the dispensing rate. The selector 30 may include indicia 31 to indicate at least the relative size of the opening of the aperture 28 and thus the dispensing rate of the material.

The dispensing arrangement 16 is disposed below the hopper 14 and typically comprises rotating blades or vanes 32 which may be carried on a disc 34. The arrangement 16 further comprises a gate or blocking member 36 which blocks aperture 28 when the spreader 10 is not in use, to preclude unwanted dispensing of material.

The motor 26 can be adapted to provide different rotational speeds to the dispensing arrangement 16 thereby controlling the area which the dispensed material covers. For this purpose, the power switch 24 can have associated therewith indicia 25 (FIGS. 2 and 3A) and means for dictating different power levels (e.g. low, medium and high).

FIG. 2 shows a material spreader 10a similar to that of FIG. 1 except that the spreader has a handle 12a comprising a tilting mechanism 40 thereby allowing the handle to tilt backward and forward as indicated by arrow T. The tilting mechanism 40 may include a lever or knob 41, or the like for allowing adjustment and fixing of the handle 12a.

In the embodiments illustrated in FIGS. 3A and 3B there is shown a spreader 10a where it is better seen that the area around the dispensing arrangement 16 is open on essentially two sides, being defined by walls 42 and 44 of a base 18a. This base 18a —as well as the base 18 of FIGS. 1 and 2—are typically designed to constitute a stable footing or support base to facilitate loading of the hopper 14.

In FIG. 3A the walls 42 and 44 are positioned such that the particulate material would be dispensed in a direction generally forward and to the left of a user holding the spreader 10b out in front of himself. However, the spreader 10b may further comprise a base pivoting mechanism (not seen) whereby the base 18a can be pivoted such that the walls 42 and 44 are positioned so that the particulate material would be dispensed in a direction generally forward and to the right of a user holding the spreader 10b out in front of himself. The Direction of pivoting is indicated by arrow P. It should be understood that other angles of dispensing (e.g. intermediate dispersing angles) could be achieved using such an arrangement.

In FIGS. 3A and 3B it is further illustrated that the spreader 10b can comprise a handle 12b having an angling mechanism 46 which, when combined with the tiltability afforded by tilting mechanism 40, provides a large variety of handle position options. The angling mechanism 46 allows for adjusting the handle 12b in the directions indicated by arrow A. Again, the mechanism could include, for example, a knob or a lever (not seen) analogous to knob 41, for allowing adjustment and fixing of the handle 12a. A swivel mechanism 48 could also be incorporated to allow further handle adjustability, wherein the handle 12b would be swivelable in a direction as shown by arrow S. Various handle positions are illustrated via dashed lines in FIGS. 3A (tilting indicated) and 3B (swiveling indicated).

The handle positions achievable due to the above mechanisms 40, 46 and 48 allow the handle 12b to be moved away from the hopper 14 for easy loading of material and for comfortable gripping thereof by a user—without preference to whether the user is left or right-handed. The handle design along with the overall spreader design (in particular the relatively low position of the dispensing arrangement 16 relative to the handle 12, 12a, 12b) provides an ergonomic arrangement whereby the user experiences relatively little fatigue as the handle can be put in a comfortable position and the weight of the spreader is below the handle thereby essentially removing any need for an operator to balance the weight of the spreader; and the arm of a user carrying the spreader can be in a relatively relaxed hanging position.

In addition, the flexibility of the handle positions facilitates efficient nesting of the spreaders 10, 10a, 10b for storage and shipping wherein the handle 12b can be moved to a position that does not interfere with the base 18, 18a being correspondingly received within the hopper 14 (i.e. a position not directly above the hopper).

Further, such a design limits user exposure with the particulate material—such as contact and inhalation—and tends to provide a more accurate dispersion of the material due to the relatively close juxtaposition of the dispensing arrangement 16 with the ground.

It will be appreciated by persons skilled in the art that the present invention is not limited by what has been particularly shown by the exemplary embodiments described hereinabove. Thus, it should be understood that numerous additional embodiments are within the scope of the invention, mutatis mutandis.

The invention claimed is:

1. An electrically powered hand-held material spreader for spreading particulate material comprising:
   a hopper;
   a dispensing mechanism disposed below said hopper;
   an aperture disposed at a bottom of said hopper and above said dispensing mechanism;
   an electric power assembly comprising an electric motor, a power source and a power switch;
   a handle positionable above said hopper; and
   an aperture selector for adjusting the opening size of the aperture; and
   wherein said spreader is adapted for being nestable within a corresponding spreader whereby a base of said spreader is adapted to be received within a hopper of said corresponding spreader.

2. The material spreader according to claim 1, wherein the electric motor has an adjustable speed to affect different spreading rates and/or coverage area of particulate material being dispersed.

3. The material spreader according to claim 2, wherein the speed of the electric motor is settable by the power switch.

4. The material spreader according to claim 3, wherein the power switch is located at the handle in a position typically convenient to at least one finger of an operator of the spreader such that the motor speed can be conveniently adjusted during use of the spreader.

5. The material spreader according to claim 1, wherein the handle comprises a tilting mechanism whereby the handle is tiltable.

6. The material spreader according to claim 5, wherein the tilting mechanism allows the handle to tilt to a position that is not directly above the hopper.

7. The material spreader according to claim 1, wherein the handle comprises an angling mechanism whereby the handle can be angled.

8. The material spreader according to claim 1, wherein the handle comprises a swiveling mechanism whereby the handle can be swiveled.

9. The material spreader according to claim 8, wherein the swiveling mechanism allows the handle to swivel to a position that is not directly above the hopper.

10. The material spreader according to claim 1, wherein the dispensing mechanism has associated therewith the base designed to provide a stable portion whereby the spreader may be rested on a surface during loading thereof.

11. The material spreader according to claim 10, wherein the base comprises a pivot mechanism for pivoting said base whereby the direction in which the material is dispensed can be directed.

12. The material spreader according to claim 11, wherein the base is adapted to nest within the hopper of said corresponding spreaders allowing for the spreaders to be nestable in a relatively compact arrangement.

13. The material spreader according to claim 1, wherein the power source is a rechargeable power source and the spreader includes a power hook-up for recharging said power source.

* * * * *